US007916072B2

United States Patent
Corazza et al.

(10) Patent No.: US 7,916,072 B2
(45) Date of Patent: Mar. 29, 2011

(54) METHOD FOR PROVIDING ASSISTANCE DATA TO MOBILE STATION OF A SATELLITE POSITIONING SYSTEM

(75) Inventors: Stéphane Corazza, Arcanville (FR); Michel Monnerat, L'Union (FR)

(73) Assignee: The European GNSS Supervisory Authority (BE)

( * ) Notice: Subject to any disclaimer, the term of this patent is extended or adjusted under 35 U.S.C. 154(b) by 0 days.

(21) Appl. No.: 12/093,109

(22) PCT Filed: Nov. 7, 2006

(86) PCT No.: PCT/EP2006/068177
§ 371 (c)(1),
(2), (4) Date: Dec. 4, 2008

(87) PCT Pub. No.: WO2007/054493
PCT Pub. Date: May 18, 2007

(65) Prior Publication Data
US 2009/0303118 A1    Dec. 10, 2009

(30) Foreign Application Priority Data
Nov. 8, 2005  (EP) .................................. 05110494

(51) Int. Cl.
*G01S 19/06* (2010.01)
*G01S 19/25* (2010.01)
(52) U.S. Cl. .............................. 342/357.43; 342/357.64
(58) Field of Classification Search ............ 342/357.02, 342/357.06, 357.12, 357.15, 357.42, 357.43, 342/357.64; 701/207, 213
See application file for complete search history.

(56) References Cited

U.S. PATENT DOCUMENTS

| 6,229,478 B1 | 5/2001 | Biacs et al. |
| 2002/0188403 A1 | 12/2002 | Lamance et al. |
| 2002/0190898 A1 | 12/2002 | Abraham et al. |
| 2003/0011511 A1* | 1/2003 | King et al. ............... 342/357.02 |
| 2004/0117114 A1 | 6/2004 | Van Diggelen |

FOREIGN PATENT DOCUMENTS

EP    1517155    3/2005

OTHER PUBLICATIONS

International Search Report PCT/EP2006/068177 Dated Feb. 12, 2007.

* cited by examiner

*Primary Examiner* — Dao L Phan
(74) *Attorney, Agent, or Firm* — Cantor Colburn LLP

(57) ABSTRACT

Satellites of a satellite positioning system broadcast within the navigation signals ephemeris data having a certain period of validity. At a mobile station, ephemeris data are required for position-fixing. In assisted satellite positioning systems, acquisition of navigation signals emitted by the satellites is facilitated as assistance data are provided to the mobile station. At a server station, a request for assistance data issued by the mobile station is received, and the server station transmits ephemeris data as part of the assistance data to the mobile station in response to its request. Upon receiving the request for assistance data issued by the mobile station, the server station decides whether the mobile station could achieve a specified position fix accuracy if the mobile station was provided with the broadcast ephemeris data. In the positive, the server station transmits the broadcast ephemeris data to the mobile station. In the negative, the server station transmits, instead of broadcast ephemeris data, long-term ephemeris data to the mobile station as part of the assistance data requested. The long-term ephemeris data are derived from satellite orbit predictions and have a period of validity substantially increased with respect to the ephemeris data broadcast by the satellites.

14 Claims, 2 Drawing Sheets

METHOD FOR PROVIDING ASSISTANCE DATA TO MOBILE STATION OF A SATELLITE POSITIONING SYSTEM

TECHNICAL FIELD

The present invention generally relates to position fixing by means of a satellite positioning system, in particular to a method for providing a mobile station with assistance data that facilitate position fixing of the mobile station.

BRIEF DESCRIPTION OF RELATED ART

GNSS (Global Navigation Satellite System) receivers determine the range to satellites orbiting around the earth to determine their geographical location. If the ranges from the receiver to the satellites and the positions of the satellites are known, the location of the receiver can be computed. As the positions of the satellites change with time, the receiver needs a description of their orbits as a function of time. As a rule of thumb, one may assume that an error of 100 m on the satellite positions translates into an error of approximately 25 m on the location determined by the receiver. Each satellite therefore transmits ephemeris data as a description of its orbit within the broadcast signals. Standalone receivers have to demodulate these ephemeris data from the signals broadcasted by the satellites in order to fix their position.

The philosophy behind AGNSS (Assisted GNSS) is to relegate certain functions that have to be executed for position fixing to a server unit, which communicates with the mobile station via a communication network, e.g. a cellular communication network. If the position of the mobile station has to be determined, the mobile station sends a request for assistance data to the server unit. In response to this request, the latter transmits the assistance data to the mobile station. Several types of assistance data may be demanded by the mobile station, e.g. reference location, reference time, navigation model, ionosphere corrections, differential corrections, almanacs, etc. Having received the assistance data from the server unit, the mobile station then processes the satellites signal, e.g. satellite acquisitions and/or pseudo range measurements. There are currently two options for computing the location: either the mobile station performs the necessary computations itself (MS-based mode) or the mobile station transmits the pseudoranges to the server unit, which computes the location and then sends it to the mobile station (MS-assisted mode).

It should be noted that, in the field of GNSS, one distinguishes between satellite orbits and the two types of data used for representing the satellite orbits, i.e. "ephemeris data", giving a precise description of satellite orbits, and "almanac data", giving a much less accurate description of satellite orbits. Almanac data are not accurate enough to allow a precise position fix that meets the system specifications, or the end user's expectations (usually up to a few tens of meters). For the mobile station, receiving the ephemeris data via the cellular network has the advantage that it does not need to demodulate the ephemeris data, which is part of the so-called "navigation message" contained in the signal in space (SIS), which is the signal broadcast by the satellites. In comparison to non-assisted GNSS, this ultimately results in facilitated position fixing, i.e. in a reduced time to fix and/or a decreased sensitivity threshold of the receiver (in terms of signal strength).

Certain methods for providing assistance data to a mobile station use the high level layers of the communication network, i.e. the applicative layers. The advantage of such a solution is that the applicative layers have a much higher data rate than the control plane layers. Nevertheless, the user can access to this layer only if he has subscribed, which raises the issue of position-fixing related to emergency calls. One would therefore prefer conveying assistance data to the mobile station and retrieving position information from the mobile station over the control plane of the communication network. The protocol is standardised in the TS44.031 (RRLP) for GSM and the TS23.371 (RRC) for UMTS. An important advantage of the control plane implementation is that data exchange with regard to position is possible, even without a SIM (Subscriber Identity Module) card. As a consequence, emergency calls can be located, even if the user has not subscribed. Another advantage is that the operator is completely in control of the process and can vouch for the service. The main drawback is that the signalling layers have a low data rate, which leads to problems if many mobile stations request for assistance data. One therefore seeks for methods for exchanging GNSS assistance data with reduced data rate.

Such a method is disclosed in U.S. Pat. No. 6,058,338. A position location server transmits almanac data with a long validity period (e.g. a week) to the mobile station, which stores these data. Upon request for assistance data, instead of sending ephemeris data, the server transmits a correction vector, which corresponds to the difference between the current ephemeris data and the current almanac data, which are both received from the satellites in real-time. Because of the long validity of the almanacs, these data need not to be retransmitted frequently. As only difference vectors are sent, a smaller number of bits can be used than that would be necessary for sending ephemeris data as broadcast by the satellites.

A problem that is not addressed by the above document is concerned with "roaming", i.e. when the mobile station asks for assistance data when located in a geographical area that is not covered by its home operator. As the server unit forwards navigation data broadcast by the satellites, the situation may occur that the satellites visible from the mobile station are not visible from the GNSS receiver of the server unit and that the validity of the last ephemeris data stored at the server unit for the concerned satellites has expired. The known solution to this problem is the deployment of a network of fixed reference GNSS receivers disposed around the globe and connected to the server unit. The operator currently has the possibility to build the network on his own, which is very costly, or conclude a service contract with an owner of such a reference network, which makes him dependent from another party.

In the present context, a satellite is considered as "visible" from a certain geographical point if it is above the horizon with respect to this point.

US 2004/0117114 A1 as well as related US 2002/0190898 A1 and US 2002/0188403 A1 describe the use of long-term satellite tracking data in a remote receiver instead of ephemeris data broadcast by the satellites. Upon request for assistance data by the remote receiver, a server transmits satellite tracking data, which are obtained via satellite orbit predictions and have a validity period of up to four days.

BRIEF SUMMARY OF THE INVENTION

The invention proposes an improved method for providing a mobile station with assistance data.

Satellites of a satellite positioning system broadcast within the navigation signals ephemeris data having a certain period of validity. The period of validity may, for instance, be defined as the time interval in which the accuracy of a position fix derived from these ephemeris data meets the specifications, respectively the end user's expectations. At a mobile station, e.g. a mobile phone, a digital camera, a portable computer, a handheld computer or any like device equipped with a satellite-positioning receiver, ephemeris data are required for position-fixing. In assisted satellite positioning systems, acquisition of navigation signals emitted by the satellites is facilitated as assistance data are provided to the mobile station. A server station, e.g. an AGNSS server or any like assistance data provider receives the ephemeris data broadcast by the satellites, e.g. by means of a reference receiver connected to it. A request for assistance data from the mobile station is received at the server station, which then transmits ephemeris data as part of the assistance data to the mobile station in response to the request. According to an important aspect of the invention, upon receiving the request for assistance data issued by said mobile station, the server station decides whether the mobile station could achieve a specified position fix accuracy if the mobile station was provided with the broadcast ephemeris data. In the positive, i.e. if the specified position fix accuracy can be achieved with the broadcast ephemeris data, the server station transmits the broadcast ephemeris data to the mobile station. In the negative, i.e. only if the specified position fix accuracy cannot be achieved with the broadcast ephemeris data, the server station transmits, instead of broadcast ephemeris data, long-term ephemeris data to the mobile station as part of the assistance data requested. The long-term ephemeris data are derived from satellite orbit predictions and have a period of validity substantially increased with respect to the ephemeris data broadcast by the satellites.

Advantageously, the decision step is kept simple. It may e.g. comprise determining whether the broadcast ephemeris data received at the server station are valid at the time of the request.

As will be appreciated, the disclosed method reduces the impact on the capacity of a communication channel between the server station and the mobile station while taking into account whether the transmission of the broadcast ephemeris data or the long-term ephemeris data is appropriate. In fact, updates of the ephemeris data stored at the mobile stations become less frequent. This results in a net reduction of bandwidth, since the overall size of long-term ephemeris data does not exceed the size of conventional ephemeris data. On the other hand, this increases the autonomy of the receiver, i.e. the period during which the receiver does not need additional assistance data. Preferably, the period of validity of the long-term ephemeris data is increased by at least a factor of 1.5, more preferably, by at least a factor of 2, and still more preferably, by at least a factor of 4, with respect to conventional ephemeris data. Preferably, the format of the long-term ephemeris data is the same as the format of the broadcast ephemeris data, so as to remain compatible with existing standards.

An external orbit prediction facility may provide the server station with the satellite orbit predictions, which then derives the long-term ephemeris data therefrom. Alternatively or additionally, the server station may provide orbit predictions using as input broadcast ephemeris data received at the server station, e.g. by means of an appropriate satellite receiver connected to the server station. In any case, the satellite orbit predictions are preferably based on a mechanical model of forces acting on the satellites. Orbit predictions may be achieved by integrating the fundamental law of mechanics, using known satellite parameters as starting values.

If the server station is equipped with a GNSS receiver, it can acquire and store the ephemeris data broadcast by the satellites as long as these are visible from the location of the receiver. If a satellite has disappeared at the horizon, the server station may compute the orbit of the satellite based on the stored ephemeris data. The skilled person will notice that this considerably reduces the problem of "roaming". Assume, for instance, the server station and its reference receiver are located in Europe, whereas the mobile station requests assistance data for Australia. In this exemplary and non-limiting case of figure, the reference receiver does not provide the server station with current ephemeris data of the concerned satellites, i.e. with those satellites that can be used at the same time for navigation in Australia. The server station may then compute long-term orbit predictions for these satellites based on the most recent ephemeris data in memory. It should be noted that, in this case, the period of time between the most recent ephemeris data and the time of the request is included in the period over which the orbit is predicted. Subsequently, these predictions are used for deriving current long-term ephemeris data. Unlike in known systems, the server station does not need to be connected to a reference network of receivers distributed around the globe. If placed in a suitable geographical location, a single reference receiver may be sufficient. It is not necessary that the reference receiver is located in the same geographical area as the server station.

Optionally, the assistance data transmitted to the mobile station may comprise ionospheric refraction data and/or synchronisation data in addition to the ephemeris data. The kind of data to be transmitted can be specified by the mobile station in the request for assistance data. Ionospheric refraction data or synchronisation data may further reduce the duration of the position fixing or increasing the accuracy of the calculated position. Most preferably, the server station receives with the request for assistance data an initial guess of the location of the mobile station e.g. the information on the cell of the communication network, in which the mobile station is located. The server station may then optimise the assistance data according to the initial guess Location-specific optimisation may be achieved in view of saving bandwidth of the communication channel between the mobile station and the server station. For instance, the ephemeris data sent to the mobile station can be reduced to ephemeris data concerning only those satellites that are currently visible from the cell of the communication network. Ionospheric refraction data transferred to the mobile station may be reduced to location-specific ionospheric refraction data.

BRIEF DESCRIPTION OF THE DRAWINGS

A preferred embodiment of the invention will now be described, by way of example, with reference to the accompanying drawings in which.

DETAILED DESCRIPTION OF THE INVENTION

Figure 1:
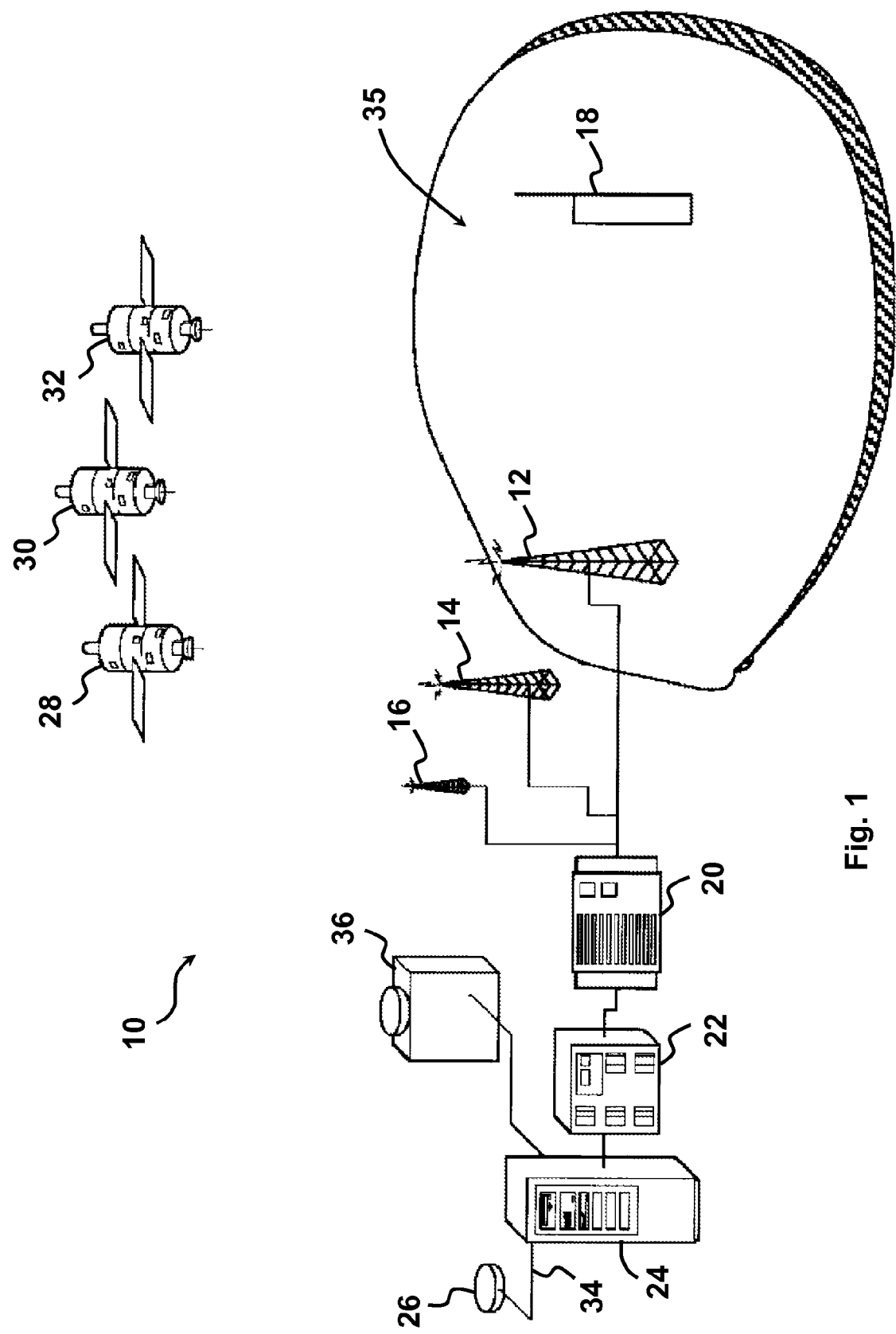
FIG. 1: is a block diagram of the components of a communication system using a satellite positioning system to locate a mobile station.

FIG. 1 shows the components of a communication system 10 using a satellite positioning system (such as e.g. GPS, GLONASS, Galileo or a combination thereof). The communication system 10 includes stationary infrastructure, such as the base transceiver stations 12, 14, 16 and a mobile station 18, e.g. the mobile phone shown in FIG. 1. The stationary infrastructure further includes a base station controller (BSC) 20, a serving mobile location centre (SLMC) 22 and an AGNSS server 24. The stationary infrastructure typically interfaces the mobile station 18 with land-based communication networks and/or the internet.

The AGNSS server is connected to a reference GNSS receiver 26, which receives ephemeris data broadcast by those GNSS satellites 28, 30, 32 that are visible from the location of the reference receiver 26. Communication between the reference receiver 26 and the AGNSS server 24 may be based on the internet protocol or any other suitable protocol. The server 24 receives the broadcast ephemeris data over the communication link 34 from the reference receiver 26 and stores the broadcast ephemeris data in a memory. The broadcast ephemeris data have, for example, a period of validity of about 3 hours from the time they have been sent. Out of the period of validity, the discrepancies between the broadcast ephemeris data and the actual satellite orbits significantly increase, so that the specified accuracy of a user's position fix cannot be achieved any more if he uses these ephemeris data.

Position-fixing may be initiated by the user of the mobile station 18 either intentionally or automatically, e.g. in response to the user starting location-aware browsing on his mobile station. Alternatively, position-fixing may be initiated by an external application, e.g. in response to the user having dispatched a distress message. In a first step, a request for assistance data is sent from the mobile station and forwarded to the AGNSS server 24. Requested assistance data may be chosen from the standardised set of the technical specification 3GPP TS 44.031 issued by the $3^{rd}$ Generation Partnership Project. This set comprises inter alia reference location (preliminary location generally deduced from cell information), reference time (to synchronise the mobile station to GNSS time), navigation model (ephemeris data), ionosphere corrections, almanacs, etc. The AGNSS server 24 then elaborates the requested assistance data, which are transmitted to the mobile station. The mobile station uses the received assistance data to acquire the signals broadcast by the satellites and to perform a pseudorange measurement. The details of this operation are well known to those skilled in the art of AGNSS. The location can than be computed either in the MS-based mode or in the MS-assisted mode, depending on the configuration of the mobile station 18.

Figure 2:
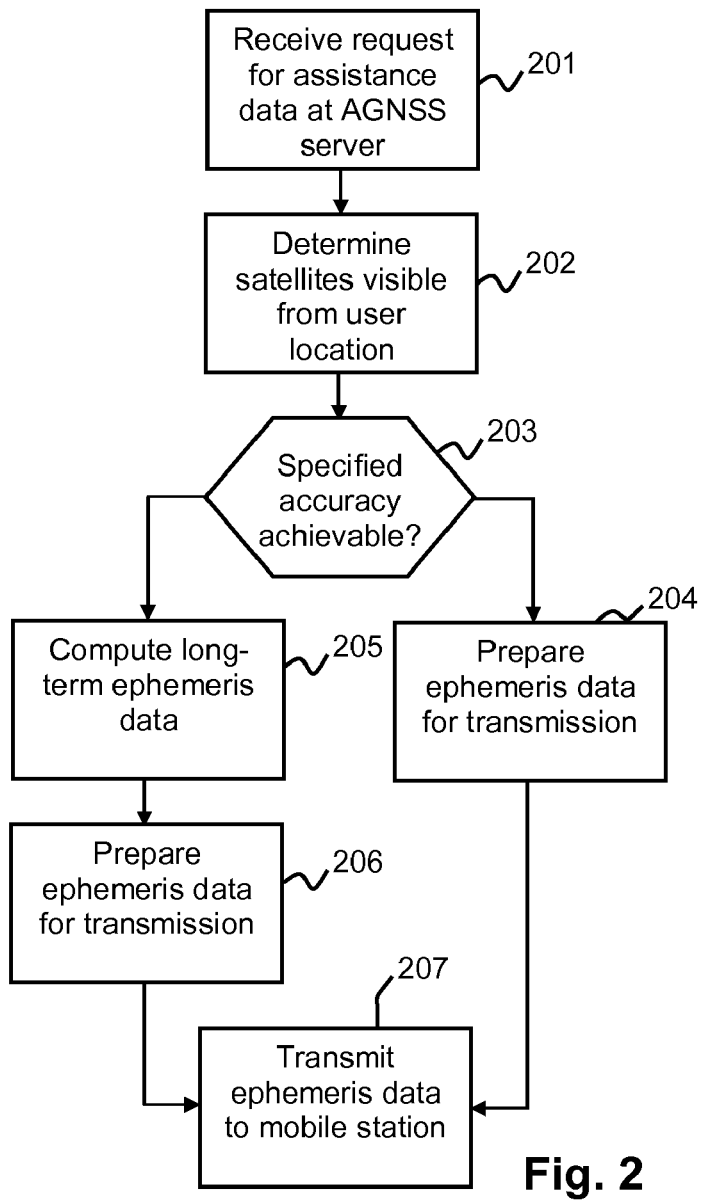
FIG. 2: is a high-level flow diagram of a method for providing assistance data to a mobile station of a satellite positioning system according to a preferred embodiment of the invention.

FIG. 2 illustrates the steps performed for elaborating ephemeris data for the mobile station 18 according to a preferred embodiment of the invention. A request for assistance data issued by the mobile station 18 is received at the AGNSS server 24 (step 201). For the present example, it is assumed that the user requests ephemeris data. The request further contains information on the network cell 35, e.g. provided by the SLMC 22, which information relates to the current location of the mobile station 18. Based on information including, for instance, cell information, almanac information and current time information, the AGNSS server 24 determines which satellites may be visible from the user's location (step 202).

The server 24 then retrieves from memory the most recent ephemeris data broadcast by these satellites and received at the reference receiver 26 and evaluates whether the mobile station 18 would be able to fix its position with the specified accuracy (e.g. 40 m) under the assumption that mobile station 18 was able to use the broadcast ephemeris data (step 203). The evaluation may be based on a simple heuristic stating that the broadcast ephemeris data of each satellite may not be used at a time not contained in the validity period of the broadcast ephemeris data.

If the ephemeris data in memory are recent enough, they may be forwarded in to the mobile station 18 as part of the assistance data. This case may e.g. occur if, at the time of the request, the user is in the same geographical area as the reference receiver 26 connected to the AGNSS server. In step 204, the ephemeris data are prepared for the transmission to the mobile station.

If the most recent ephemeris data stored in memory are not valid any more or if e.g. the traffic load on the communication channel between the AGNSS server 24 and the mobile station 18 is high, long-term ephemeris data are computed (step 205) and prepared for the transmission to the mobile station (step 206).

After having prepared the ephemeris data for transmission within the assistance data, e.g. by formatting the ephemeris data according to the RINEX format, the ephemeris data are transmitted to the mobile station 18 (step 207).

In the presently described embodiment, there are two possibilities of providing the long-term ephemeris data.

The server 24 is connected to an external orbit prediction facility 36. As far as the Galileo system is concerned, this function may be assumed by the so-called Orbit and Synchronisation Processing facility (OSPF). The orbit prediction facility 36 may dispatch to the AGNSS server 24 the orbit predictions or even the long-term ephemeris data derived from the orbit predictions.

Additionally, the server 24 keeps a history of the position and velocity of a given satellite as long as it receives ephemeris data from this satellite by means of the reference receiver 26. These data are used as input for extrapolating the orbit of the satellite by means of a mechanical model, taking into account the forces acting on the satellite. The orbit prediction concept bases on integration of the fundamental law of mechanics, with the known satellites positions and velocities as starting values. Orbit prediction may take into account gravitation of earth, moon and sun, earth's pole rotation, earth's sideral rotation, precession and nutation, solar pressure, tides, etc. Satellite orbits are predicted for a period that substantially exceeds the period of validity of the broadcast ephemeris data used as input. Depending on the orbit prediction algorithm that is used, orbits can be predicted for 24 hours or even more. The predicted orbits serve to derive current long-term ephemeris data.

It shall be noted that the external orbit prediction facility 36 may compute the orbits and/or the long-term ephemeris data in the same or a similar way as described above for the server 24. Internal and external orbit and/or ephemeris computation may be used redundantly, i.e. one serving as backup for the other in case of a dysfunction, or in a complementary way. In particular, the latter possibility may be interesting if the AGNSS server 24 has to deal with different satellite constellations, e.g. GPS and Galileo. For Galileo, an orbit prediction facility 36 is planned, whereas this seems not to be the case for GPS. Ephemeris data regarding GPS satellites could be computed by the server 24 itself, while ephemeris data regarding Galileo satellites might be provided by the OSPF.

Figure 3:
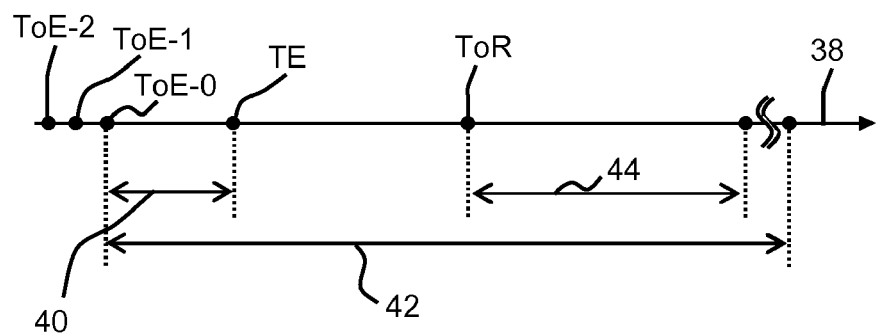
FIG. 3: is an illustration of a timeline of events occurring before, respectively after a request for assistance data.

FIG. 3 shows the course of the events on a time line. Time progresses from left to right along the axis 38. The AGNSS server receives ephemeris data broadcast by a particular satellite at different times ToE-2, ToE-1, ToE-0 (ToE standing for "time of ephemeris"). At the time ToR (time of request), the AGNSS server receives a request for ephemeris data for that particular satellite. The latest ephemeris data of the concerned satellite with respect to the time ToR were received at a time ToE-0. FIG. 3 illustrates the case where the request occurs after the validity of the most recent ephemeris data has expired: the validity interval 40 of these ephemeris data ends before the time ToR at the time TE. At the time ToR, the AGNSS server provides an orbit prediction for a time interval 42 that includes the time ToR. The orbit prediction starts at a point in time, for which position and velocity of the satellites are known, i.e. before TE. Long-term ephemeris data are derived, from the orbit prediction, for a time interval 44, which has substantially longer duration than the validity period of broadcast ephemeris data, and which includes, preferably at the beginning of time interval 44, the time ToR.

It should be noted that orbit predictions can be performed in response to a specific request of a mobile station. Alternatively, orbit predictions can be continuously updated in a memory and accessed in case of a request of a mobile station to derive the long-term ephemeris data.

The invention claimed is:

1. A method of providing assistance data to a mobile station for facilitating acquisition of signals emitted by satellites of a satellite positioning system, said satellites broadcasting within said signals, ephemeris data having a certain period of validity, said method comprising:
   receiving at a server station a request for assistance data from said mobile station;
   receiving at the server station said broadcast ephemeris data;
   deciding at the server station whether said mobile station could achieve a specified position fix accuracy if provided with said broadcast ephemeris data; and
   when it is decided that said mobile station could achieve a specified position fix accuracy: transmitting said broadcast ephemeris data to said mobile station;
   when it is decided that said mobile station could not achieve a specified position fix accuracy: transmitting long-term ephemeris data to said mobile station as part of said assistance data in response to said request, said long-term ephemeris data having a period of validity substantially increased with respect to said ephemeris data broadcast by said satellites and said long-term ephemeris data being derived from satellite orbit predictions.

2. A method according to claim 1, wherein said deciding at the server station whether said mobile station could achieve a specified position fix accuracy if provided with said broadcast ephemeris data comprises determining whether the broadcast ephemeris data received at the server station are valid at a time of said request.

3. A method according to claim 2, wherein at least a part of said satellite orbit predictions are received at the server station from an external orbit prediction facility.

4. A method according to claim 1, wherein said satellite orbit predictions are based on a mechanical model of forces acting on said satellites.

5. A method according to claim 1, wherein said satellite orbit predictions are obtained using broadcast ephemeris data received at the server station as input.

6. A method according to claim 1, comprising:
   transmitting at least one of ionospheric refraction data and synchronisation data as a part of said assistance data.

7. A method according to claim 1, comprising:
   receiving with said request for assistance data, an initial guess of a location of the mobile station; and
   optimising said assistance data according to said initial guess.

8. A method according to claim 1, wherein said satellite positioning system comprises at least one of GPS, GLONASS and Galileo.

9. A method of providing assistance data to a mobile station for facilitating acquisition of signals emitted by satellites of a satellite positioning system, said satellites broadcasting within said signals, ephemeris data having certain period of validity, said method comprising:
   receiving at a server station a request for assistance data from said mobile station;
   receiving at the server station said broadcast ephemeris data;
   determining at the server station whether the broadcast ephemeris data received at the server station are valid at a time of said request; and
   when it is determined that the broadcast ephemeris data are valid at the time of said request: transmitting said broadcast ephemeris data to said mobile station;
   when it is determined that said broadcast ephemeris data are valid at the time of said request: transmitting long-term ephemeris data to said mobile station as part of said assistance data in response to said request, said long-term ephemeris data having a period of validity substantially increased with respect to the ephemeris data broadcast by said satellites and said long-term ephemeris data being derived from satellite orbit predictions.

10. A method according to claim 9, wherein at least a part of said satellite orbit predictions are at least one of received at the server station from an external orbit prediction facility, based on a mechanical model of forces acting on said satellites, and obtained using broadcast ephemeris data received at the server station as input.

11. A method according to claim 10, comprising:
   transmitting at least one of ionospheric refraction data and synchronisation data as a part of said assistance data.

12. A method according to claim 10, comprising:
   receiving with said request for assistance data an initial guess of the location of the mobile station; and
   optimising said assistance data according to said initial guess.

13. A method according to claim 10, wherein said satellite positioning system comprises at least one of GPS, GLONASS and Galileo.

14. A method according to claim 11, comprising:
   receiving with said request for assistance data, an initial guess of the location of the mobile station; and
   optimising said assistance data according to said initial guess.

* * * * *